United States Patent
Yiu

(10) Patent No.: US 6,601,885 B1
(45) Date of Patent: Aug. 5, 2003

(54) STAKING AND MOUNTING PIN FOR VEHICLE DOOR LATCH

(75) Inventor: Arnold Yiu, Thornhill (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/890,603

(22) PCT Filed: Feb. 1, 2000

(86) PCT No.: PCT/CA00/00090

§ 371 (c)(1),
(2), (4) Date: Jan. 7, 2002

(87) PCT Pub. No.: WO00/46471

PCT Pub. Date: Aug. 10, 2000

Related U.S. Application Data

(60) Provisional application No. 60/118,005, filed on Feb. 1, 1999.

(51) Int. Cl.[7] .................................................. E05B 9/00
(52) U.S. Cl. ................................ 292/337; 292/DIG. 53
(58) Field of Search ........................... 292/201, DIG. 23, 292/216, 340, 337, DIG. 53, DIG. 64

(56) References Cited

U.S. PATENT DOCUMENTS

| | | | | |
|---|---|---|---|---|
| 3,572,797 A | * | 3/1971 | Shay .................... 292/341.12 |
| 4,497,514 A | * | 2/1985 | Moriya .................... 292/336.3 |
| 4,639,023 A | * | 1/1987 | Boisvert ..................... 292/262 |
| 4,880,262 A | * | 11/1989 | Mugnolo .................... 292/202 |
| 5,348,357 A | * | 9/1994 | Konchan .................... 292/216 |
| 5,538,150 A | * | 7/1996 | Perkins ........................ 212/292 |
| 5,746,457 A | * | 5/1998 | Kim ........................... 292/216 |
| 5,787,794 A | * | 8/1998 | Plantan ........................ 92/161 |
| 5,863,069 A | * | 1/1999 | Wickenheiser .............. 280/751 |

* cited by examiner

Primary Examiner—Gary Estremsky
(74) Attorney, Agent, or Firm—Clark Hill PLC

(57) ABSTRACT

A latch and mounting pin assembly (20) includes a latch housing (22) with an inner plate mounted to one side (28) and an outer plate mounted to an opposing side (26). Each of the plates include three apertures which are aligned with each other. Three mounting pins (36) are included with each pin extending through a corresponding pair of apertures. A head (38) is disposed on one end of each of the pins for abutting the outer plate. The latch and pin assembly is characterized by each mounting pin having an enlarged barrel portion extending from the head to a shoulder. The shoulder abuts the inner plate to orient the outer plate relative to the inner plate. There is also provided a threaded shank (50) extending outward from the shoulder to provide a means for mounting the assembly to a frame of a vehicle.

21 Claims, 3 Drawing Sheets

STAKING AND MOUNTING PIN FOR VEHICLE DOOR LATCH

This application claims benefit of Provisional Application No. 60/118,005, filed Feb. 1, 1999.

FIELD OF INVENTION

The subject invention relates to vehicle latches and mounting pins associated with the latches for securing the latches together and to corresponding frames of a vehicle.

BACKGROUND OF THE INVENTION

Latches are frequently utilized in vehicles for a variety of applications, such as to secure a door, trunk, hatch or hood. The latches typically include a housing enclosing latching and releasing mechanisms. The housing is sandwiched between inner and outer plates which each have a plurality of apertures disposed therein. The inner and outer plates are welded or otherwise attached to the housing such that the corresponding apertures are aligned. The housing is mounted to a vehicle frame by suitable fasteners, such as threaded bolts, which pass through corresponding apertures.

Examples of known latch mounting configurations are disclosed in U.S. Pat. Nos. 4,281,478; 5,172,946; 5,308,129 and 5,328,219. These designs require that the housing be completely assembled without the fasteners and then incorporate the fasteners during the mounting of the latch. In addition, added space within the housing is needed in order to accommodate the subsequently added mounting bolts.

An improved design utilizes mounting bolts as pivot points for various components where the mounting bolts also act to hold the housing together. In other words, the latching and releasing mechanisms disposed within the housing utilize the area that the bolts travel through the housing as pivot points.

An example of this prior art design is disclosed in U.S. Pat. No. 5,000,495. A sleeve is provided within the housing which defines the pivot point. The bolt passes through the sleeve and interconnects the inner and outer plates. In particular, the outer plate has a threaded portion which receives the bolt. This design is advantageous in that separate pivot pins may not be required, the space occupied by the bolts is utilized and the housing is held together by the bolts themselves. However, the design requires that the outer plate have threaded apertures to interlock the inner and outer plates to the housing. In addition, the latch must be mounted to the vehicle by additional mounting bolts. Hence, this design requires additional manufacturing steps to make and mount the latch.

Another example of a prior art latch design is disclosed in FIGS. 6 and 7. Again, a sleeve 10 is provided within a housing which may define a pivot point. The sleeve 10 is be flared at either end to secure inner 12 and outer 14 plates to the housing. A bolt 16 is then partially threaded into the sleeve 10 to retain the bolt 16 to the latch during shipping. Upon arrival on the assembly line, the latch is presented to a mounting frame 18 of a vehicle and the bolt 16 is extended beyond the sleeve 10 to mount the housing as shown in FIG. 7. This design is likewise advantageous in that separate pivot pins may not be required and the space occupied by the bolts 16 is utilized. This design, however, requires that the sleeve 10 be separately press fit to the housing to hold the inner 12 and outer 14 plates to the housing. In addition, the mounting bolts 16 are separately mounted through to the sleeves 10. Hence, this design also requires additional parts and manufacturing steps to make and mount the latch. Additionally, this fastening configuration is over designed for the rigors of shipping a typical latch from the manufacturing facility to a vehicle assembly plant.

Accordingly, it would be desirable to develop a latch incorporating an integral mounting pin which secures the plates and housing of the latch together, acts as a pivot point for interior latch components and also secures the latch to a vehicle. Further, the latch should not suffer from the deficiencies outlined above such that the latch is made of fewer parts and is easier to assemble and install.

SUMMARY OF THE INVENTION

The disadvantages of the prior art may be overcome by providing a latch and mounting pin assembly comprising a latch housing having an inner side and an opposing outer side. An inner plate abuts the inner side and has at least one aperture. An outer plate similarly abuts the outer side opposite the inner plate and has at least one aperture aligned with the aperture of the inner plate. At least one mounting pin, having first and second distal ends, extends through the apertures. A head is disposed on the first distal end of the pin for abutting the outer plate. The assembly is characterized by the mounting pin having an enlarged barrel portion extending from the head to a shoulder with the shoulder abutting the inner plate to orient the outer plate relative to the inner plate.

Accordingly, the subject invention includes a mounting pin which can be a pivot point for the latch components, can hold the inner and outer plates against the housing and also provides mounting locations for the latch. In other words, the subject latch and pin assembly holds the latch together for shipping and provides a fastening portion for securing the latch to a vehicle. The subject invention is also of a compact design which is easily and efficiently manufactured and installed.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
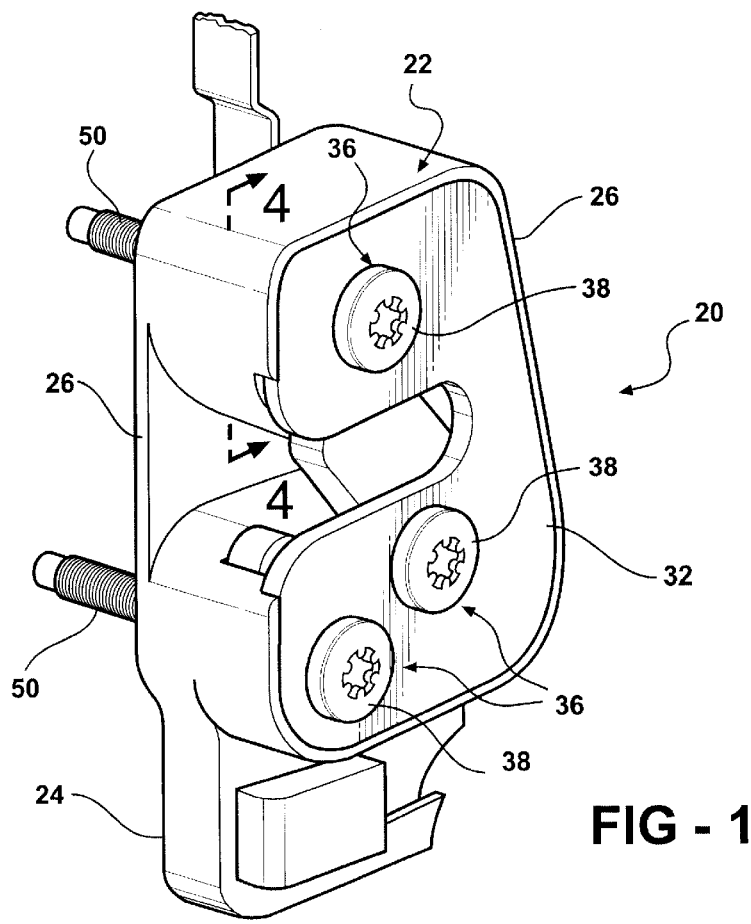
FIG. 1 is a perspective view of a latch assembly incorporating a mounting pin in accordance with the subject invention.

Referring to the Figures, wherein like numerals indicate like or corresponding parts throughout the several views, a latch and mounting pin assembly is generally shown at 20 in FIG. 1.

The latch assembly 20 preferably has a design and configuration which defines a door latch suitable for securing a door of a vehicle (not shown). As appreciated, the subject invention may be utilized in various configurations to secure hatches, hoods, trunks and the like.

The latch assembly 20 comprises a latch housing 22 having an inner side 24 and an opposing outer side 26. As appreciated, inner and outer are relative terms which are used to preferably orient the subject housing 22 when the housing 22 is mounted to the vehicle. The housing 22 may be positioned in any suitable orientation depending upon the particular vehicle manufacturer.

Figure 5:
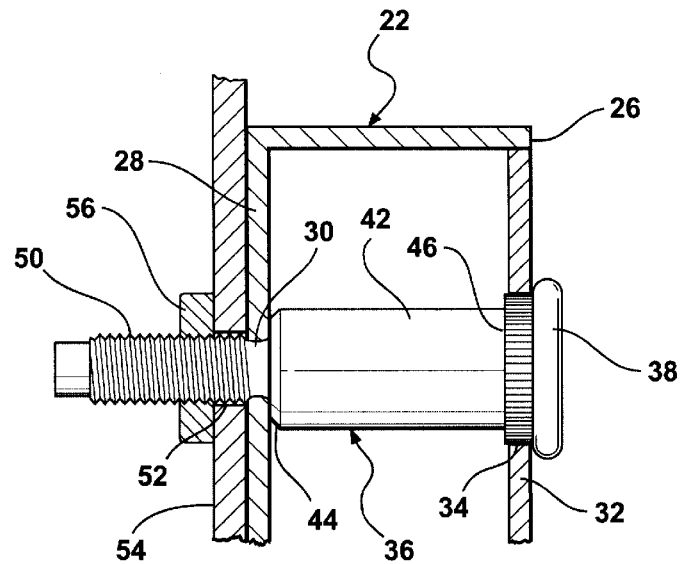
FIG. 5 is a partially cross-sectional view of the assembly mounted to a door frame.
Figure 5A:
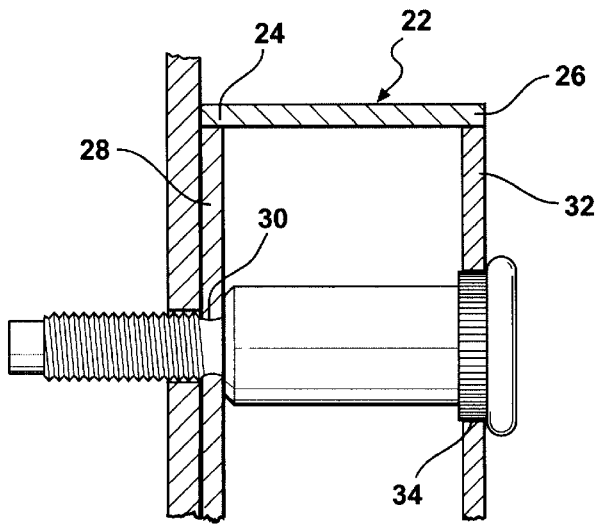
FIG. 5a is a partially cross-sectional view of a latch assembly having distinct latch housing, inner plate, outer plate.
Figure 6:
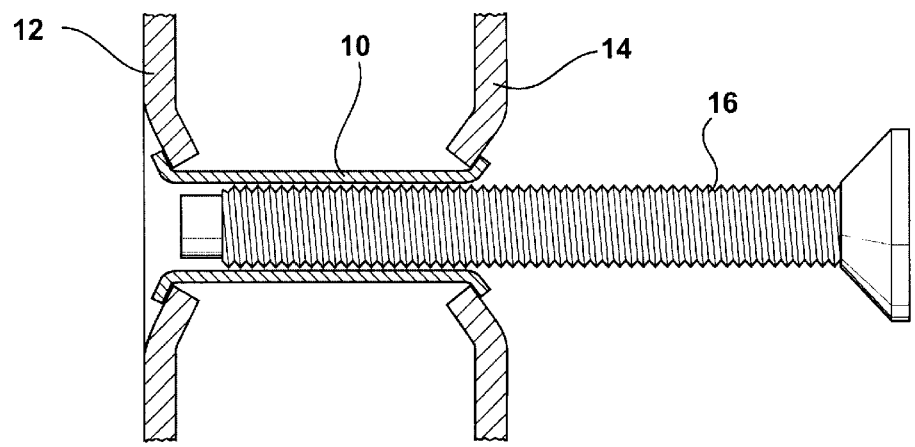
FIG. 6 is a partially cross-sectional view of a prior art mounting pin and latch.
Figure 7:
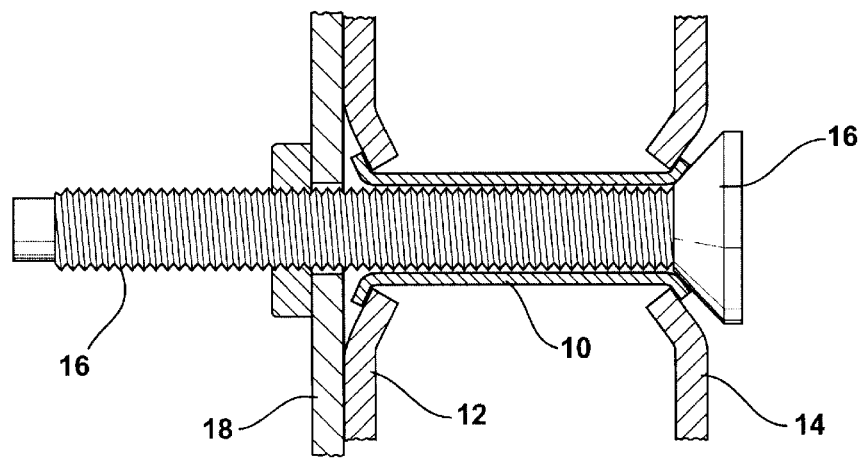
FIG. 7 is a partially cross-sectional view of the prior art mounting pin and latch secured to a door frame.

As shown in FIG. 5a an inner plate 28 abuts the inner side 24 and has at least one aperture 30. Similarly, an outer plate 32 abuts the outer side 26 opposite the inner plate 28 and has at least one aperture 34 aligned with the aperture 30 of the inner plate 28. Preferably, there are three apertures 30 disposed within the inner plate 28 and three apertures 34 disposed within the outer plate 32 which are aligned with the three apertures 30 of the inner plate 28. As appreciated, there may be any number of apertures 30, 34 within the corresponding inner 28 and outer 32 plates as desired. As mentioned above, the terms inner and outer are purely illustrative of a preferred mounting orientation and are in no way intended to limit the subject application. The plates 28, 32, however, are preferably oriented in opposing directions with the corresponding apertures being aligned.

The inner plate 28 is preferably an integral portion of the housing 22 which defines a cavity (not numbered) disposed within the housing 22. The outer plate 32 acts as a cover for the cavity to encapsulate the housing 22. Alternatively, the inner 28 and outer 32 plates may both be separable from the housing 22 such that the housing 22 is sandwiched between the inner 28 and outer 32 plates.

A number of locking and releasing components (not numbered but well known in the art) are disposed within the cavity of the housing 22 to provide the operating characteristics of the latch and pin assembly 20. Some of the components may include a primary ratchet, pawl, spring and the like as is known in the art.

At least one mounting pin 36, which has first and second distal ends, extends through a pair of aligned apertures 30, 34. Preferably there are three mounting pins 36, each having first and second distal ends, with one of the pins 36 extending through each of the three pairs of corresponding apertures 30, 34. As will be discussed in greater detail below, the mounting pins 36 interlock the inner 28 and outer 32 plates to the housing 22 to create a portable latch assembly 20. The pins 36 may also act as pivot points for the primary and secondary latches, the pawl and other like components. The subject invention therefore creates a compact and portable assembly 20 which is self contained.

Figure 2:
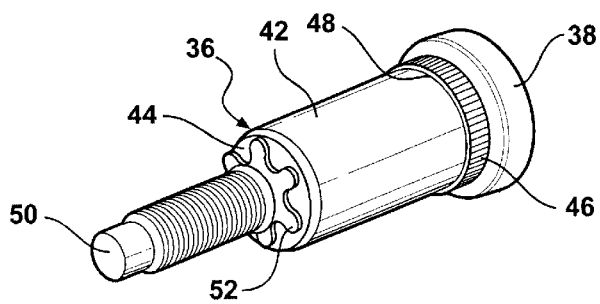
FIG. 2 is a perspective front view of a mounting pin of the latch assembly of FIG. 1.
Figure 3:
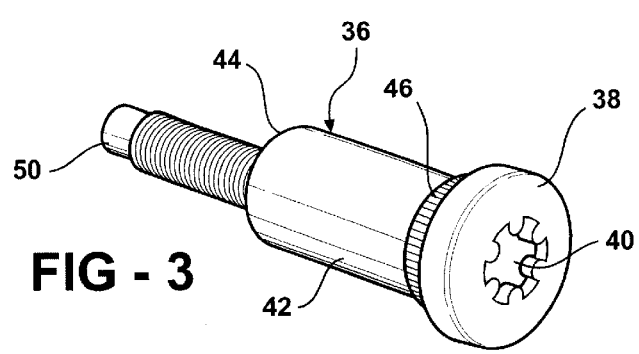
FIG. 3 is a perspective rear view of the mounting pin of FIG. 2.

Referring also to FIGS. 2 and 3, one of the mounting pins 36 is shown in greater detail. Each of the mounting pins 36 are substantially identical. For illustrative purposes, only one pin 36 is shown and subsequently described.

A head 38 is disposed on the first distal end of the pin 36 for abutting the outer plate 32. As best shown in FIG. 3, the head 38 of the pin 36 includes an axial recess 40 for receiving an installation tool (not shown).

The mounting pin 36 has an enlarged barrel portion 42 extending from the head 38 to a shoulder 44. The enlarged barrel portion 42 has a diameter which is smaller than a diameter of the head 38. The barrel portion 42 is also of a substantially uniform circular cross-section. The barrel portion 42 includes a first locking section 46 disposed adjacent the head 38 for press fitting the barrel portion 42 into the aperture 34 of the outer plate 32, thereby securing the first distal end of the mounting pin 36 to the outer plate 32. The first locking section 46 preferably comprises a plurality of axially extending ridges 46 disposed circumferentially around the barrel portion 42. The ridges 46 maybe of any suitable size, width or number, so long as the first distal end of the pin 36 is adequately secured to the outer plate 32.

A circumferential step 48 is disposed adjacent the head 38 and has a diameter larger than a diameter of the barrel portion 42 with the ridges 46 disposed on the circumferential step 48. As appreciated, the aperture 34 in the outer plate 32 is complementary in size to the circumferential size of the step 48. When the pin 36 is press fitted into the outer plate 32, the ridges 46 create small grooves in the outer plate 32 to lock the pin 36 to the housing 22 to prevent rotation of pin 36 relative to the housing 22.

The mounting pin 36 further includes a threaded shank 50 having a diameter less than that of the barrel portion 42 and extends from the shoulder 44 to the second distal end. The shank 50 extends through the aperture 30 in the inner plate 28 and outwardly from the inner plate 28 to provide the mounting means for the latch assembly 20 to the vehicle. Preferably, the threaded shank 50 has a design similar to a machine threaded bolt with a non-threaded tip. The length, diameter, thread pitch, thread size and other like parameters of the shank 50 may be of any suitable design to suit a particular application. A diameter of the aperture 30 within the inner plate 28 is smaller than the diameter of the aperture 34 in the outer plate 32 due to the relative sizes of the shank 50 and barrel portion 42.

A second locking section 52 is disposed on the mounting pin 36 adjacent the shoulder 44 of the enlarged barrel portion 42 for securing the mounting pin 36 to the inner plate 28 as is discussed below. This first 46 and second 52 locking sections work in conjunction to continuously hold the inner 28 and outer 32 plates against the housing 22, which creates a portable interlocked latch pin assembly 20 as shown in FIG. 1.

The second locking section 52 preferably comprises a locking flange 52 having a plurality of undulating projections. The undulating projections define a "flower petal" shaped locking flange 52. A diameter of the locking flange projections is smaller than the diameter of the barrel portion 42.

Figure 4:
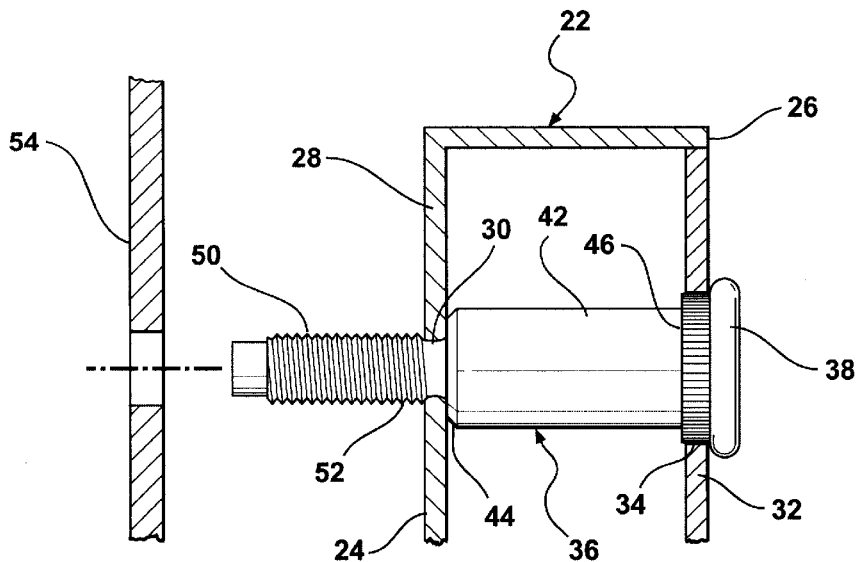
FIG. 4 is a partially cross-sectional view of the latch assembly taken along line 4—4 of FIG. 1.

Referring also to FIGS. 4 and 5, the mounting pin 36 is further illustrated with respect to the pin 36 being disposed within the housing 22. In particular, the shoulder 44 of the barrel portion 42 abuts the inner plate 28 to orient the outer plate 32 relative to the inner plate 28. In other words, the enlarged barrel portion 42 defines the depth of the cavity for the housing 22.

In addition, the locking flange 52 is spaced from the shoulder 44 of the barrel portion 42 to extend through the aperture 30 in the inner plate 28. Hence, the locking flange 52 abuts an exterior side of the inner plate 28 and the shoulder 44 engages an interior side of the inner plate 28 to further interlock the mounting pin 36 to the housing 22. The mounting pin 36 is therefore secured to the housing 22 by being press fitted within the aperture 34 of the outer plate 32 and interlocked about the aperture 30 of the inner plate 28. The bias of the locking flange 52 works with the head 38 in order to restrict axial movement along the mounting pin 36.

During assembly of the latch and pin assembly 20, the threaded shank 50 passes through a corresponding aperture (not numbered) in a frame 54. Preferably, the frame 54 is a door frame such that the assembly 20 is utilized to secure the door to the vehicle. The subject invention is not limited to being mounted to door frames 54 and any suitable portion of the vehicle may be utilized. To complete the installation, a nut 56 is threaded onto the threaded shank 50 to secure the housing 22 to the frame 54. As has now become clear, the subject invention provides for a simplified installation procedure of the latch which does not require the use of separate bolts or the assembly of the latch housing 22.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A latch assembly comprising:
    a latch housing having an inner side and an opposing outer side,
    an inner plate abutting said inner side and having at least one aperture,
    an outer plate abutting said outer side opposite, spaced apart and generally parallel to said inner plate and having at least one aperture axially aligned with said aperture of said inner plate,
    at least one mounting pin having first and second distal ends extending through said axially aligned apertures of said inner and outer plates,
    said mounting pin having a head disposed on said first distal end of said pin for engaging said outer plate, a first locking section disposed adjacent said head securing said first distal end of said mounting pin to said outer plate, and an enlarged barrel portion extending from said head to a shoulder disposed between said distal ends with said shoulder engaging said inner plate to orient said outer plate relative to said inner plate and maintaining said space between said inner and outer plates.

2. An assembly as set forth in claim 1 wherein said mounting pin further includes a smaller diameter threaded shank extending from said shoulder to said second distal end.

3. An assembly as set forth in claim 2 wherein said enlarged barrel portion includes a first locking section disposed adjacent said head for press fitting said barrel portion into said aperture of said outer plate to secure said first distal end of said mounting pin to said outer plate.

4. An assembly as set forth in claim 3 wherein said first locking section comprises a plurality of outwardly extending ridges disposed circumferentially around said barrel portion.

5. An assembly as set forth in claim 4 further including a circumferential step disposed adjacent said head and having a diameter larger than a diameter of said barrel portion with said ridges disposed on said circumferential step.

6. An assembly as set forth in claim 3 further including a second locking section disposed on said mounting pin adjacent said shoulder of said enlarged barrel portion for securing said mounting pin to said inner plate such that said barrel portion and said mounting pin are secured to said inner plate to continuously hold said inner and outer plates against said housing, thereby creating a portable interlocked latch and mounting pin assembly.

7. An assembly as set forth in claim 6 wherein said second locking section comprises a locking flange having a plurality of undulating projections.

8. An assembly as set forth in claim 7 wherein said locking flange is spaced from said shoulder of said barrel portion to extend through said aperture in said inner plate such that said locking flange abuts an exterior side of said inner plate and said shoulder abuts an interior side of said inner plate to further interlock said mounting pin to said housing.

9. An assembly as set forth in claim 8 wherein a diameter of said locking flange is smaller than a diameter of said barrel portion.

10. An assembly as set forth in claim 6 wherein said at least one aperture of said inner plate is further defined as three apertures and said at least one aperture of said outer plate is further defined as three apertures aligned with said three apertures of said inner plate.

11. An assembly as set forth in claim 10 wherein said at least one mounting pin is further defined as three mounting pins each having first and second distal ends extending through corresponding apertures.

12. An assembly as set forth in claim 11 wherein each of said mounting pins include a corresponding head having an axial recess.

13. A mounting pin for a latch assembly having a latch housing with an inner side and an opposing outer side, an inner plate abutting the inner side and having at least one aperture, an outer plate abutting the outer side opposite, spaced apart and generally parallel to the inner plate and having at least one aperture axially aligned with the aperture of the inner plate, said mounting pin comprising:
    first and second distal ends extending through the axially aligned apertures of the inner and outer plates, a head disposed on said first distal end of said pin for engaging the outer plate, a first locking section disposed adjacent said head securing said first distal end of said mounting pin to the outer plate, and an enlarged barrel portion extending from said head to a shoulder disposed between said distal ends with said shoulder engaging the inner plate to orient the outer plate relative to the inner plate and maintaining the space between the inner and outer plates.

14. A mounting pin as set forth in claim 13 wherein said mounting pin further includes a smaller diameter threaded shank extending from said shoulder to said second distal end.

15. A mounting pin as set forth in claim 14 wherein said enlarged barrel portion includes a first locking section disposed adjacent said head for press fitting said barrel portion into said aperture of said outer plate to secure said first distal end of said mounting pin to said outer plate.

16. A mounting pin as set forth in claim 15 wherein said first locking section comprises a plurality of outwardly extending ridges disposed circumferentially around said barrel portion.

17. A mounting pin as set forth in claim 16 further including a circumferential step disposed adjacent said head and having a diameter larger than a diameter of said barrel portion with said ridges disposed on said circumferential step.

18. A mounting pin as set forth in claim 17 further including a second locking section disposed on said mounting pin adjacent said shoulder of said enlarged barrel portion for securing said mounting pin to said inner plate such that said barrel portion and said mounting pin are secured to said inner plate to continuously hold said inner and outer plates against said housing, thereby creating a portable interlocked latch and mounting pin assembly.

19. A mounting pin as set forth in claim 18 wherein said second locking section comprises a locking flange having a plurality of undulating projections.

20. A mounting pin as set forth in claim 19 wherein said locking flange is spaced from said shoulder of said barrel portion to extend through said aperture in said inner plate such that said locking flange abuts an exterior side of said inner plate and said shoulder abuts an interior side of said inner plate to further interlock said mounting pin to said housing.

21. A mounting pin as set forth in claim 20 wherein a diameter of said locking flange is smaller than a diameter of said barrel portion.

* * * * *